May 30, 1972  W. V. CONNER  3,666,443
PLUTONIUM PRODUCTION
Filed Nov. 5, 1969

INVENTOR.
WILLIAM V. CONNER
BY

United States Patent Office 3,666,443
Patented May 30, 1972

3,666,443
PLUTONIUM PRODUCTION
William V. Conner, Nederland, Colo., assignor to the United States of America as represented by the United States Atomic Energy Commission
Filed Nov. 5, 1969, Ser. No. 874,190
Int. Cl. C22b 61/04
U.S. Cl. 75—84.1                1 Claim

ABSTRACT OF THE DISCLOSURE

The process for the reduction of plutonium fluorides to plutonium metal comprising heating to the reaction temperature a mixture of plutonium fluorides and calcium metal together with an additive selected from the group consisting of magnesium fluoride and calcium chloride, allowing the mixture to react to form a plutonium metal button, and physically separating the plutonium metal button from the reaction slag.

BACKGROUND OF INVENTION

Plutonium and compounds of plutonium are used for various nuclear reactor and heat source applications. In the processing of this plutonium for these applications, it is often desirable that the plutonium be in the form of elemental plutonium metal.

Plutonium is conventionally produced by neutron irradiation of uranium-238 in a nuclear reactor or the like. The plutonium is then recovered from reactor fuel elements by various chemical separation processes. The plutonium thus separated is commonly in the form of various compounds, principally a plutonium fluoride.

A process for obtaining plutonium metal from these plutonium fluorides, such as plutonium tetrafluoride, is to mix the plutonium fluoride with calcium metal and heat this mixture to the reaction temperature. When the reaction temperature is reached, a thermochemical reaction takes place which forms plutonium metal and calcium fluoride. The metal yield obtained from this process may be increased by adding iodine to the plutonium fluoride-calcium metal mixture. The iodine reacts with calcium to liberate heat and form calcium iodide and the calcium iodide thus formed lowers the melting point of the calcium fluoride slag. The iodine may help, particularly in small scale reductions, to compensate for relatively high heat losses from the reduction reaction while the lower melting point slag may increase the plutonium metal separation from the slag, however, the supplemental heat provided by the iodine may be much less significant for relatively large scale reductions, such as about 1 kilogram or more, of plutonium. In addition, there are several problems associated with the use of iodine in these reduction processes. For example, the iodine may vaporize during and before the reaction and cause halide corrosion of the metal reaction vessels in which the reductions are made. This corrosion may contaminate any plutonium metal yield. The iodine also may cause corrosion in the vessels which are used to dissolve the reduction slags and crucibles when the residual plutonium is recovered therefrom. Also this corrosion may decrease the service life of the equipment used to recover the residual plutonium.

In any process used, it is desirable that the plutonium metal reduced from the fluoride be coalesced into a single bead, button or slug which may then be readily separated from the reaction slag to minimize further processing of the slag. Prior reduction processes have generally left a sufficient amount of plutonium metal dispersed within the slag as a powder or in separate pieces to require extensive processing of the slag to remove the plutonium or formed alloys of metals which required further separation. Any unnecessary further processing which may be required is expensive and time consuming and, because of the radioactive properties of the plutonium, may present additional radiation hazards to process personnel which it would be desirable to avoid. Also, the plutonium metal pieces often have coatings of slag on the surface which when removed by acid baths and the like may also remove some plutonium and decrease the yield.

SUMMARY OF INVENTION

In view of the limitations of the prior art as noted above, it is an object of this invention to provide an improved process for the reduction of plutonium fluorides which has a high percentage of yield in the form of a single pure plutonium metal button.

It is a further object of this invention to provide a process for the reduction of plutonium fluorides using low corrosive materials.

Various other objects and advantages will appear from the following description of one embodiment of the invention and the most novel features will be particularly pointed out hereinafter in connection with the appended claims. It will be understood that various changes in the details, materials and steps of the process, which are herein described and illustrated in order to explain the nature of the invention, may be made by those skilled in the art.

The invention comprises heating a mixture of plutonium fluorides, calcium and an additive selected from a group consisting of magnesium fluoride and calcium chloride to the reaction temperature of the mixture, continuing the reaction to completion, and physically separating a plutonium metal button from the reaction slag.

DESCRIPTION OF DRAWING

The present invention as illustrated in the accompanying drawing wherein.

DETAILED DESCRIPTION

Figure 1:
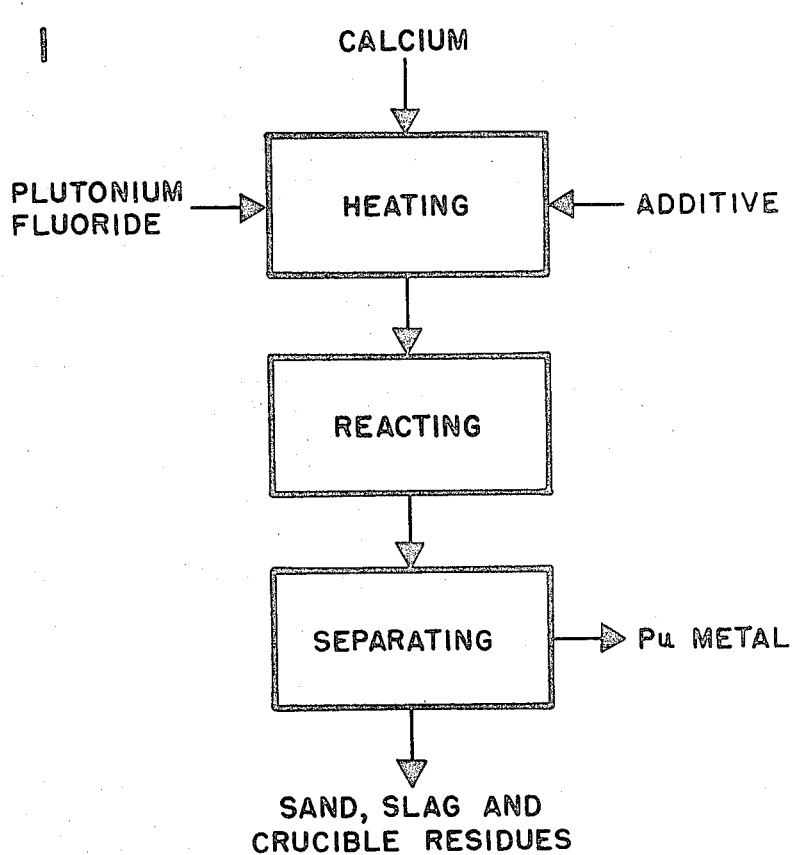
FIG. 1 is a flow diagram showing the steps of the process.

This process may be performed, as shown in FIG. 1, by first mixing a material containing a plutonium compound, such as plutonium fluorides, with the calcium metal and the desired additive in certain mole percent ratios. Generally, the calcium may be mixed in an amount from about 20–40 mole percent in excess of that required to reduce the plutonium fluoride. The additive, which for purposes of this invention is selected from the group consisting of magnesium fluoride and calcium chloride, may be mixed in an amount of about 10 to 20 mole percent of the calcium fluoride theoretically formed in the reduction, preferably about 10 mole percent for calcium chloride and about 20 mole percent for magnesium fluoride. Greater and smaller amounts of the additive may be used but with correspondingly smaller plutonium metal recovery rates. The materials may be mixed by any suitable means such as manually or with a mechanical mixer to assure a uniform distribution of the mixture substituents to provide a complete and efficient reaction.

Figure 2:
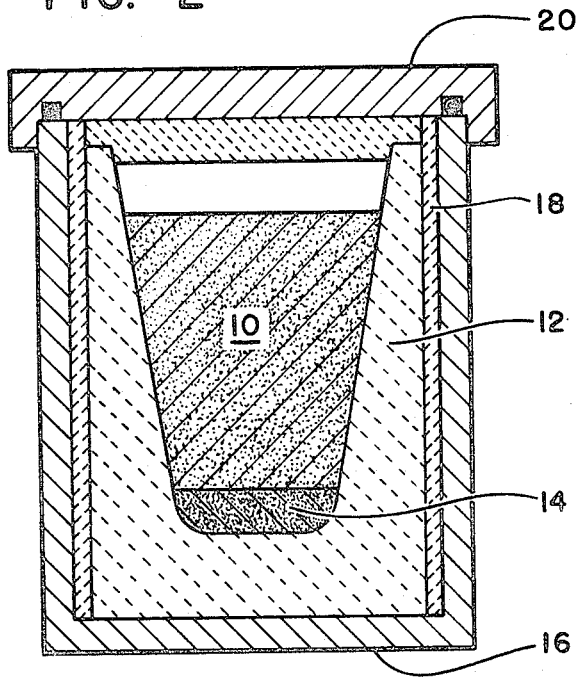
FIG. 2 is a cross-sectional view of apparatus for performing this process.

The mixture or reduction charge may then be placed within an appropriate reaction vessel or bomb reactor of the type shown in FIG. 2. The plutonium fluoride-calcium-additive mixture or charge 10 is generally placed on a layer 14 of calcium within an appropriate crucible 12. Crucible 12 is made of some refractory materials such as magnesia and is placed within a steel pressure vessel 16. The annulus between vessel 16 and crucible 12 may be filled with a sand or powder 18 of the same material as the crucible. Pressure vessel 16 may then be sealed by cover plate 20 and the interior thereof purged of any residual moisture and air. Vessel 16 may then be placed in an appropriate furnace (not shown), such as an induction furnace, and heated to the reaction temperature.

The reduction charge may then be heated to the reaction temperature of the mixture. As the mixture is heated, the temperature of the mixture may be monitored by appropriate thermocouple means (not shown) until a sudden rise or increase in temperature occurs indicating that the mixture is reacting. In many applications the mixture will continue to react without additional heating, though, if such heating is required it may be continued until the reaction is complete. When the reaction is completer, the vessel may be permitted to cool to room temperature and the crucible and reaction products contained therein removed from the vessel. The plutonium metal in the form of a button, slug or bead may then be physically separated or recovered from the reaction slag by breaking the crucible and tapping the metal button with a hammer. The button will fall away from the slag, sand and crucible residues.

With the process of this invention all or a substantial portion of the plutonium in the original charge is recovered as part of a single plutonium metal button, and the slag is further processed to recover any residual plutonium.

3200 gram batch of plutonium tetrafluoride was well mixed and split into smaller batches containing about 1600 grams of plutonium tetrafluoride each. One of these batches was reduced without magnesium fluoride to serve as a control while the other batch was reduced with magnesium fluoride. The magnesium fluoride reduction charge was prepared by placing the plutonium tetrafluoride batch together with 533 grams of calcium and 70 grams of magnesium fluoride into a mixing containers. These materials were hand mixed and the reduction charge placed in a prepared reaction vessel, as described above, and then heated until the charge reacted. The vessel was then allowed to cool before the product metal and slag were removed. The plutonium metal was coalesced in a single metal button which was separated from the slag, pickled in dilute nitric acid, buffed and weighed. The plutonium button from the magnesium fluoride reduction separated very cleanly from the slag, and the surface of the button was very bright and shiny. The controlled batch was reduced in the same manner as the magnesium fluoride batch and the results compared. The button from the control reduction did not separate from the slag as cleanly as did the magnesium fluoride button and was covered by a thin layer of slag which was removed in the pickling and buffing operation. The magnesium fluoride reduction produced a metal yield of about 98.1% while the controlled reduction only produced a yield of about 97% with button purities of about 99.93 percent.

Additional reduction runs were made using about 50 grams of plutonium as plutonium tetrafluoride selected from one batch of material. These reductions included three control reductions without any additive, two reductions with about 10 mole percent magnesium fluoride, three reductions with about 20 mole percent magnesium fluoride, two reductions with about 30 mole percent magnesium fluoride, one reduction with about 10 mole percent calcium chloride and one run with about 20 mole percent calcium chloride. All runs were performed using the process and apparatus described above with respect to FIGS. 1 and 2. A comparison of the yields obtained from the various reductions is given in Table I. (These yields are calculated on a weight percent basis.) Since some of the reductions produced metal which was loosely attached to the main button, two yields were calculated, the first using only the weight of the main button, and the second yield using the weight of the main button and loosely attached or separate metal.

TABLE I

| Reduction No. | Reduction charge weight, g. | | | | | Button wt., g. | Button yield, percent | Total metal wt., g. | Total metal yield, percent |
| --- | --- | --- | --- | --- | --- | --- | --- | --- | --- |
| | $PuF_4$ | Pu | Ca | $MgF_2$ | $CaCl_2$ | | | | |
| 1 | 65.81 | 50.02 | 21.74 | 0 | | 31.7 | 63.37 | 32.2 | 64.37 |
| 2 | 66.05 | 50.05 | 22.74 | 0 | | 40.8 | 81.27 | 44.88 | 89.40 |
| 3 | 65.55 | 49.82 | 22.74 | 0 | | 41.1 | 82.50 | 41.1 | 82.50 |
| 4 | 65.7 | 49.93 | 22.74 | 2.60 | | 41.6 | 83.32 | 41.6 | 83.32 |
| 5 | 65.74 | 49.96 | 22.74 | 2.60 | | 41.24 | 82.55 | 44.92 | 89.91 |
| 6 | 65.8 | 50.00 | 22.74 | 5.21 | | 39.55 | 79.10 | 39.55 | 79.10 |
| 7 | 66.2 | 50.31 | 22.74 | 5.21 | | 41.21 | 81.92 | 42.84 | 85.15 |
| 8 | 66.0 | 50.16 | 22.74 | 5.21 | | 44.72 | 89.15 | 44.72 | 89.15 |
| 9 | 65.72 | 49.95 | 22.74 | 7.81 | | 38.48 | 77.04 | 38.48 | 77.04 |
| 10 | 65.8 | 50.00 | 22.74 | 7.81 | | 35.7 | 71.40 | 35.7 | 71.40 |
| 11 | 65.9 | 50.08 | 22.74 | | 4.64 | 47.5 | 94.85 | 47.5 | 94.85 |
| 12 | 65.65 | 49.89 | 22.74 | | 9.28 | 46.25 | 92.70 | 46.25 | 92.70 |

As can be seen from this table, the reductions with the enumerated additives in all but two cases produced a single button of plutonium metal. The addition of sufficient magnesium fluoride to a reduction charge to produce a slag containing from abut 10 to 20 mole percent magnesium fluoride did improve the metal coalescence and yield while the addition or more than 20 mole percent magnesium fluoride decreased the yield somewhat. The control reductions had an average main button yield of about 75.71 percent while the 10, 20 and 30 mole percent magnesium fluoride runs had average main button yields af about 82.94, 83.39 and 74.22 percents respectively. Both the 10 and 20 mole percent calcium chloride reductions produced well formed single buttons with no loosely attached metal and with a high percent yield (average yield of 93.78 percent).

Other reductions were run using about 35 grams of plutonium from a single batch of plutonium tetrafluoride or with about 10 and 15 grams of plutonium from different plutonium feed materials. The 15 grams scale runs included about 20% by weight plutonium dioxide. All runs were performed in accordance with the process described above with respect to FIGS. 1 and 2. Runs were made using iodine as an additive for each of the respective scale runs. A comparison of the yields obtained from these respective reductions is given in the following Table II.

TABLE II

| Reduction No. | PuF$_4$ | Pu | Ca | I$_2$ wt. g. | CaCl$_2$ | Button wt., g. | Metal yield, percent |
|---|---|---|---|---|---|---|---|
| 1 | 45.95 | 35.29 | 15.2 | | | 32.21 | 91.27 |
| 2 | 46.06 | 35.37 | 15.2 | | 3.35 | 32.91 | 93.04 |
| 3 | 46.04 | 35.36 | 15.2 | | | 32.62 | 92.25 |
| 4 | 45.82 | 35.19 | 15.2 | | 3.25 | 33.39 | 94.88 |
| 5 | 46.37 | 35.61 | 19.0 | 16.74 | | 30.38 | 85.31 |
| 6 | 45.88 | 35.23 | 19.0 | 16.74 | 3.25 | 30.85 | 87.57 |
| 7 | 46.00 | 35.33 | 19.0 | 16.74 | | 24.5 | 69.35 |
| 8 | 45.98 | 35.31 | 19.0 | 16.74 | 3.25 | 26.54 | 75.16 |
| 9 | 15.60 | 14.98 | 9.78 | 15.94 | | 11.99 | 80.04 |
| 10 | 15.62 | 15.00 | 9.78 | 15.94 | 1.39 | 12.51 | 83.40 |
| 11 | 13.0 | 10.15 | 6.6 | 10.6 | | 9.50 | 93.59 |
| 12 | 13.0 | 10.15 | 6.6 | 10.6 | | 9.60 | 94.58 |
| 13 | 13.0 | 10.15 | 6.6 | 10.6 | | 9.42 | 92.81 |
| 14 | 13.0 | 10.15 | 6.6 | 10.6 | | 9.62 | 94.77 |
| 15 | 12.82 | 10.0 | 6.6 | 10.6 | 0.93 | 9.66 | 96.60 |

The 35 g. scale charges containing iodine all "splattered" when they reacted, lowering the yields. The splattering was apparently caused by some reaction between the iodine and the particular lot of magnesia crucibles used for the 35 g. scale reductions. Even with the splattering, however, the calcium chloride reductions still produced better yields than the control reductions with iodine alone. Even though the 15 gram reductions included about 20% plutonium dioxide which lowered the yields somewhat, the calcium chloride reductions still produced a higher yield. The reduction run average yields for the separate plutonium scale runs were higher in each run for those reductions which contained the calcium chloride additive.

Direct comparisons between different batches of plutonium fluoride feed materials cannot be made since the composition of the feed material may have some effect on the total yield. However, in almost every instance, the reductions made with either magnesium fluoride or calcium chloride as an additive produced higher yields than those using iodine or no additives. Further, the reductions with the magnesium fluorides or calcium chloride additives generally produced better plutonium button coalescence.

What is claimed is:

1. In the process for the reduction of plutonium fluorides with calcium consisting essentially of mixing initial constituents of plutonium fluorides and calcium metal, heating the mixture to a temperature sufficient to initiate reaction of said mixture constituents, reacting the constituents of said mixture to completion to form a plutonium metal button and a slag containing calcium fluoride product, and physically separating the plutonium metal button from said slag, the improvement consisting of adding to said initial mixture an additive selected from the group consisting of magnesium fluoride and calcium chloride in an amount between 10 and 20 mole percent of the theoretical calcium fluoride product formed from reacting said constituents.

References Cited

UNITED STATES PATENTS

| 2,890,110 | 6/1959 | Baker | 75—84.4 X |
| 3,049,423 | 8/1962 | Reavis et al | 75—84.1 |
| 3,147,109 | 9/1964 | Knighton et al. | 75—84.1 |

FOREIGN PATENTS

| 863,149 | 3/1960 | Great Britain | 75—84.1 |

CARL D. QUARFORTH, Primary Examiner

R. E. SCHAFER, Assistant Examiner

U.S. Cl. X.R.

75—84.4